United States Patent
Berman et al.

(10) Patent No.: US 9,628,482 B2
(45) Date of Patent: Apr. 18, 2017

(54) MOBILE BASED LOGIN VIA WIRELESS CREDENTIAL TRANSFER

(71) Applicant: CELLCO PARTNERSHIP, Basking Ridge, NJ (US)

(72) Inventors: Paul Berman, Roselle Park, NJ (US); Mohammad Raheel Khalid, Budd Lake, NJ (US); Ji Hoon Kim, Lyndhurst, NJ (US); Cory Michael Bruno, South River, NJ (US); Mauricio Pati Caldeira de Andrada, South Plainfield, NJ (US); Samir Vaidya, Highland Park, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 14/069,145

(22) Filed: Oct. 31, 2013

(65) Prior Publication Data
US 2015/0121482 A1   Apr. 30, 2015

(51) Int. Cl.
*H04L 29/06*  (2006.01)
*H04L 29/08*  (2006.01)

(52) U.S. Cl.
CPC .......... *H04L 63/0884* (2013.01); *H04L 63/10* (2013.01); *H04L 67/18* (2013.01)

(58) Field of Classification Search
CPC ...... H04W 12/06; H04W 84/12; H04L 63/10; H04L 67/18; H04L 63/0884
See application file for complete search history.

(56) References Cited

U.S. PATENT DOCUMENTS

| | | | |
|---|---|---|---|
| 6,459,988 B1 | 10/2002 | Fan et al. | |
| 6,490,443 B1 | 12/2002 | Freeny | |
| 6,496,855 B1 * | 12/2002 | Hunt | G06F 21/31 709/202 |
| 6,594,765 B2 | 7/2003 | Sherman et al. | |
| 6,607,136 B1 | 8/2003 | Atsmon et al. | |
| 6,708,171 B1 * | 3/2004 | Waldo | G06F 9/548 |
| 6,732,278 B2 * | 5/2004 | Baird et al. | 726/7 |
| 7,076,797 B2 * | 7/2006 | Loveland | 726/4 |
| 7,275,685 B2 | 10/2007 | Gray et al. | |
| 7,430,537 B2 | 9/2008 | Templeton et al. | |
| 7,610,616 B2 | 10/2009 | Masuouka et al. | |
| 7,672,644 B2 | 3/2010 | Sun et al. | |
| 7,685,629 B1 * | 3/2010 | White et al. | 726/2 |
| 7,860,488 B2 * | 12/2010 | Wollersheim | H04L 63/126 455/403 |
| 8,005,075 B1 | 8/2011 | Webster et al. | |

(Continued)

*Primary Examiner* — Jung Kim
*Assistant Examiner* — James J Wilcox

(57) ABSTRACT

Systems and methods for mobile-based login via wireless credential transfer are disclosed. In some implementations, a proxy server receives a registration request for a receiver device for accessing a secure resource. The proxy server registers the receiver device in response to the registration request. The proxy server receives, from a transmitter device, information identifying the transmitter device along with authentication credentials for authenticating the receiver device to access the secure resource. The proxy server identifies the receiver device based on the information identifying the transmitter device. The proxy server forwards, to the receiver device, the authentication credentials for authenticating access of the receiver device to the secure resource.

18 Claims, 5 Drawing Sheets

(56) References Cited

U.S. PATENT DOCUMENTS

| | | | |
|---|---|---|---|
| 8,059,542 B1 | 11/2011 | Oroskar et al. | |
| 8,442,526 B1 * | 5/2013 | Bertz | H04L 65/1016 455/433 |
| 8,443,425 B1 * | 5/2013 | Evans et al. | 726/5 |
| 8,646,060 B1 | 2/2014 | Ben Ayed | |
| 8,649,768 B1 * | 2/2014 | Gaddam | H04W 12/06 455/411 |
| 8,995,992 B1 * | 3/2015 | Cohen | H04W 24/06 455/410 |
| 9,112,883 B2 * | 8/2015 | Abbott | H04L 12/588 |
| 9,246,918 B2 * | 1/2016 | Marshall | H04L 63/10 |
| 9,325,687 B2 * | 4/2016 | Caldeira de Andrada | H04L 63/08 |
| 2003/0084171 A1 | 5/2003 | De Jong et al. | |
| 2005/0105734 A1 | 5/2005 | Buer et al. | |
| 2007/0136573 A1 | 6/2007 | Steinberg | |
| 2008/0022375 A1 | 1/2008 | Stanley | |
| 2008/0295159 A1 | 11/2008 | Sentinelli | |
| 2009/0037732 A1 * | 2/2009 | Boccon-Gibod et al. | 713/168 |
| 2009/0132813 A1 | 5/2009 | Schibuk | |
| 2009/0247186 A1 * | 10/2009 | Ji et al. | 455/456.1 |
| 2009/0265775 A1 | 10/2009 | Wisely et al. | |
| 2010/0022254 A1 | 1/2010 | Ashfield et al. | |
| 2010/0035590 A1 * | 2/2010 | Martin | H04L 63/304 455/414.3 |
| 2011/0111737 A1 * | 5/2011 | Abbott | H04L 12/588 455/414.1 |
| 2011/0258689 A1 * | 10/2011 | Cohen et al. | 726/7 |
| 2011/0271331 A1 | 11/2011 | Adams et al. | |
| 2012/0185166 A1 | 7/2012 | Chiang et al. | |
| 2012/0196566 A1 | 8/2012 | Lee et al. | |
| 2012/0302163 A1 | 11/2012 | Kitchen | |
| 2013/0111208 A1 * | 5/2013 | Sabin | G06F 21/35 713/171 |
| 2013/0205380 A1 | 8/2013 | Avni et al. | |
| 2013/0227668 A1 * | 8/2013 | Mocanu | 726/8 |
| 2013/0262311 A1 | 10/2013 | Buhrmann et al. | |
| 2014/0045454 A1 | 2/2014 | Monjas Llorente et al. | |
| 2014/0049636 A1 | 2/2014 | O'Donnell et al. | |
| 2014/0096215 A1 * | 4/2014 | Hessler | 726/7 |
| 2014/0177481 A1 * | 6/2014 | Gaviria | H04L 65/1016 370/259 |
| 2014/0222676 A1 | 8/2014 | Lee et al. | |
| 2014/0273965 A1 * | 9/2014 | Raleigh | H04W 12/04 455/411 |
| 2014/0380444 A1 | 12/2014 | Kelley | |
| 2015/0120549 A1 * | 4/2015 | Khalid | G06Q 20/4014 705/44 |
| 2015/0121496 A1 * | 4/2015 | Caldeira De Andrada | H04L 63/08 726/7 |
| 2015/0121501 A1 * | 4/2015 | Khalid | H04L 63/0815 726/8 |
| 2015/0127939 A1 * | 5/2015 | Mazandarany | H04L 9/32 713/168 |
| 2015/0288661 A1 * | 10/2015 | Monk | H04L 63/0281 726/7 |

* cited by examiner

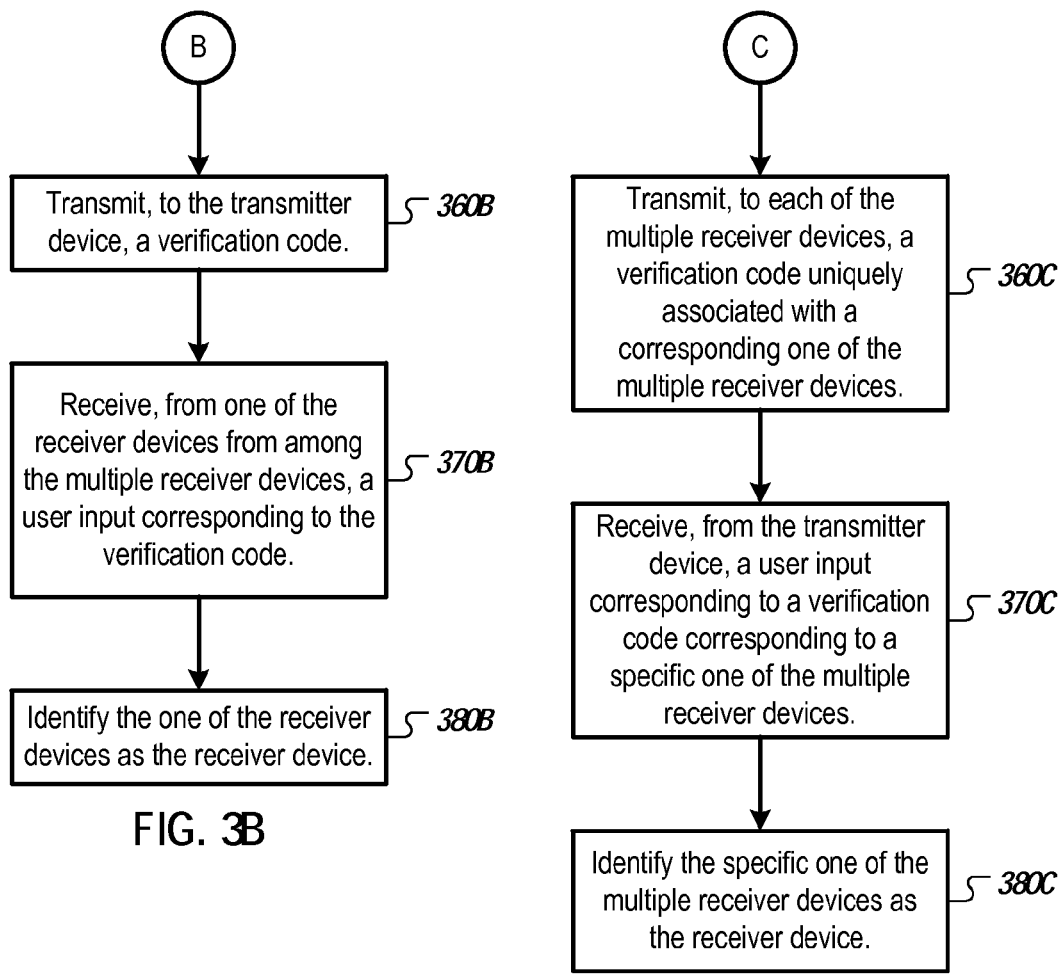

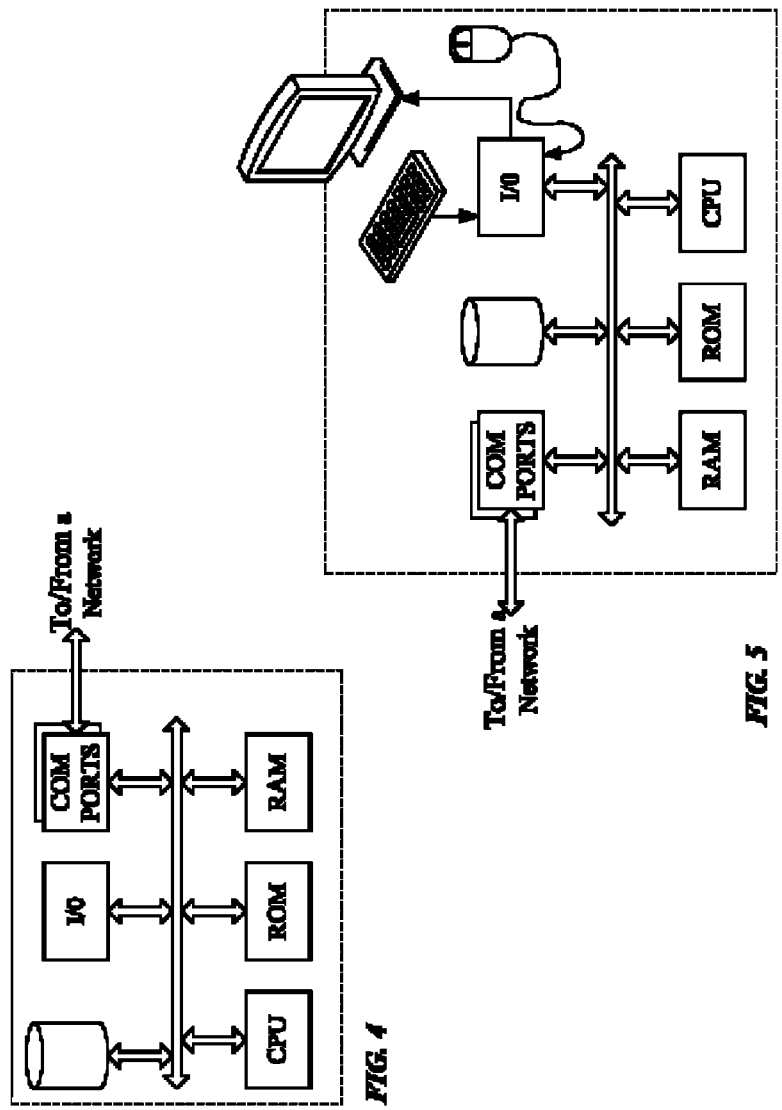

MOBILE BASED LOGIN VIA WIRELESS CREDENTIAL TRANSFER

CROSS-REFERENCE TO RELATED APPLICATIONS

This application is related to application Ser. No. 14/069,323, filed on Oct. 31, 2013 and titled "MOBILE AUTHENTICATION FOR WEB PAYMENTS USING SINGLE SIGN ON CREDENTIALS," application Ser. No. 14/069,080, filed on Oct. 31, 2013 and titled "REMOTE AUTHENTICATION USING MOBILE SINGLE SIGN ON CREDENTIALS," and application Ser. No. 14/069,310, filed on Oct. 31, 2013 and titled "CONNECTED AUTHENTICATION DEVICE USING MOBILE SINGLE SIGN ON CREDENTIALS." The entire content of the above-identified applications are incorporated herein by reference.

BACKGROUND

Users typically register to access many different online resources, for example, email service(s), banking service(s), brokerage service(s), utility service(s), social network(s), online store(s), video viewing service(s), newspapers(s), etc. In order to access an online resource, a user may need to provide login credentials for the online resource. Each online resource may have different login credentials associated therewith, regardless of whether or not the requirements for setting the login credentials are the same or different. Login credentials may be needed to provide security and to prevent unauthorized persons from accessing the online resources. For those online resources whose login credential requirements are the same, using the same (or even similar) login credentials can thus present an unacceptable security risk, while, on the other hand, remembering multiple different login credentials may be cumbersome for a user. As the foregoing illustrates, a new approach for securely providing access to online resource(s) may be desirable.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 3A-3C illustrate an exemplary process for identifying a receiver device configured to receive authentication credentials from a transmitter device;

FIG. 4 is a simplified functional block diagram of a computer that may be configured to function as the proxy server shown in FIG. 1; and FIG. 5 is a simplified functional block diagram of a personal computer or other work station or terminal device.

DETAILED DESCRIPTION

Figure 1:
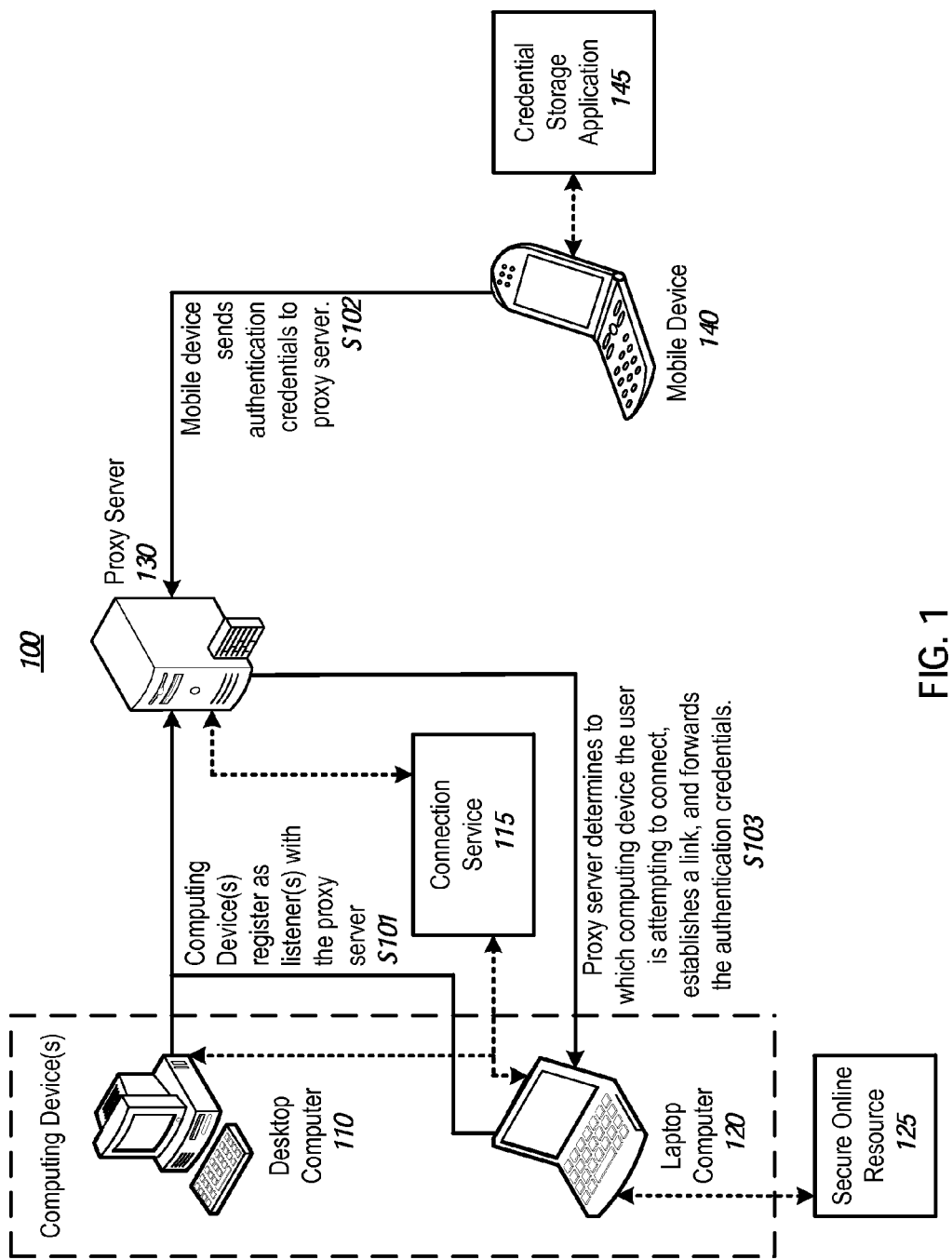
FIG. 1 illustrates an exemplary system for mobile-based authentication.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

As set forth above, users oftentimes create login credentials (e.g., usernames and passwords) for accessing multiple different web or application-based resources. However, users may have difficulty remembering or accessing their login credentials, requiring a time-consuming resetting of the login credentials. However, a user typically carries a mobile device (e.g., a mobile phone) which is oftentimes on the user's person and accessible to the user. The mobile device may be used as an authentication source, as the mobile device may be a trusted device with the user.

In some aspects, the subject technology provides techniques for accessing online resources using a mobile device. The mobile device (e.g., a transmitter device) may have an application installed on the device, which allows the memory of the mobile device to serve as a repository for the information or credentials which may be transmitted to a receiver device. The mobile device stores credential(s) of a user for accessing online resource(s). The credential(s) may include username(s), passwords(s), payment account information, shipping address information, etc. The receiver device may be any computer including a web browser or another application for accessing the online resource(s). For example, the receiver device may be a laptop or desktop computer of the user that includes a web browser (e.g., Internet Explorer®) or the receiver device may be a tablet computer or a mobile phone that includes an application for accessing online resource(s), for example, an online banking application or a social networking application. The receiver device may lack a wired or short-range radio connection to the transmitter device. However, oftentimes, when the user attempts to access an online resource using the receiver device, both the user and the transmitter device are proximate to the receiver device and can be used for authenticating access of the receiver device to the online resource.

The receiver device may have a service running in the background, such as a Java applet. Using the service, the receiver device may register itself as a listener with a hosted forwarding proxy server. The proxy server is an online server that may connect to the transmitter device and the receiver device using one or more of a wired network, a wireless local area network, or a wireless wide area network. In operation, the proxy server receives a registration of one or more receiver devices for accessing information (e.g., credential(s) for accessing online resource(s)) via the proxy server. For example, the user may register his/her office desktop computer, home laptop computer, home desktop computer, and tablet computer to access information via the proxy server. The proxy server receives encrypted information (e.g., encrypted credentials for accessing online resource(s)) from the transmitter device for forwarding to the receiver device. For example, the user may desire to access a social networking service, which requires login credentials, from his/her home desktop computer (the first receiver computer) and may transmit the login credentials for accessing the social networking service to the home desktop computer from his/her mobile phone. The proxy server transmitting the login credentials from the mobile phone to the desktop computer may link or pair the mobile phone and the desktop computer based on the mobile phone and the desktop computer being geographically proximate to one another (e.g., within 15 meters of one another), being connected to the same WiFi network, or being associated with the same user account, stored at the proxy server.

When the user is ready to transmit the information or credential to the receiver device in proximity to the user, the user may initiate a transfer from the mobile application in the mobile phone. The mobile application may first authenticate itself with the proxy server using a unique user identifier that identifies the user and/or the mobile device. The unique identifier may include, for example, a username or a Mobile Directory Number (MDN).

In one implementation, the proxy server identifies the receiver device from among the plurality registered receiver devices based on the receiver device being proximate to the transmitter device. For example, the user may be sitting at the desktop computer and the mobile phone may be on the table proximate to the desktop computer. The proxy server forwards the encrypted information (e.g., the login credentials for accessing the social networking service) from the proxy server to the receiver device. As a result, the receiver device is able to access the online resource (e.g., log in to the social networking service). In another implementation, the proxy server identifies the receiver device based on the unique identifier of the receiver device being previously associated with the unique identifier of the mobile device. Once the mobile device and the receiver device are paired together, as an added security, the mobile and/or the receiver device may also be presented a challenge to ensure that both devices should be paired. The challenge may include any type of challenge, for example, a pin-based challenge, a pattern challenge, a movement-based challenge, etc. Once the receiver device has been identified and authenticated using the above steps, the mobile device may send the information or credential to the receiver device over an encrypted channel. The communication medium may be encrypted using a shared secret key, which may be commonly developed by the application and background service developer and preinstalled into both pieces of software.

Once the information has been transmitted to the receiver device, depending on the type of information transmitted, the receiver device may then choose how to proceed. For example, if the mobile device has transmitted login credentials for a website, upon receipt, the background service of the receiver device may then attempt to use web browser auto-fill capability to insert those credentials into the appropriate website with which the user was attempting to authenticate. This method can be extended to sending any kind of information by extending the mobile application to provide different "destination types" and programming the background service of the non-mobile device to accept and have access to those various destinations once the information is received.

Reference now is made in detail to the examples illustrated in the accompanying drawings and discussed below. FIG. 1 illustrates an exemplary system 100 for mobile-based authentication. As shown, the system 100 includes computing devices such as, for example, a desktop computer 110 and a laptop computer 120. The system 100 also includes a proxy server 130 and a mobile device 140. While two computing devices 110 and 120 are illustrated, the subject technology may be implemented with any number of computing devices, which may include a desktop computer, a laptop computer, a tablet computer, a mobile phone, a personal digital assistant (PDA), a digital music player, a smart watch, etc. Also, while the mobile device 140 is illustrated as being a mobile phone, in some cases, the mobile device 140 may be a tablet computer, a personal digital assistant (PDA), a digital music player, a smart watch, a key fob including one or more processors, a network interface, and a memory, etc. The mobile device 140, the laptop computer 120, and the desktop computer 110 may be end-user computing devices which may be used by end-users (e.g., consumers or customers) to access the Internet, write paper(s), play game(s), make telephone call(s), etc.

In one implementation, the computing device(s) 110 and 120 register as listeners with the proxy server 130 to be able to receive authentication credentials from mobile devices, including the mobile device 140 (Step 101). To this end, the computing device(s) 110 and 120 may have a connection service 115 running in the background, for example, a Java applet, which may register itself as a listener with the proxy server 130. Similarly, the mobile device 140 may have a credential storage application 145 installed on the mobile device 140, serving as a repository for the information or credentials which may be transmitted to one of the computing devices 110 or 120.

As described more fully below, when a user is ready to transmit the information or credential wirelessly from the mobile device 140 to a computing device 110 or 120, the user may initiate a transfer from the application on the mobile device 140. The application may authenticate itself with the proxy using a unique user identifier (e.g., a username or MDN) and sends authentication credentials to the proxy server 130 (Step 102). The proxy server 130 determines to which computing device (e.g., desktop computer 110 or laptop 120) the user is attempting to transmit authentication credentials from the mobile device 140, and forwards the authentication credentials from the mobile device 140 to the computing device 110 or 120 via the established link (Step 103). The determination to which computing device the user is attempting to transmit the authentication credentials may be made based on a geographic proximity of the mobile device 140 to the computing device or based on a stored pairing, at the proxy server 130, of the mobile device 140 and the computing device. After receiving the authentication credentials, the computing device 120 may connect to the secure online resource 125. The proxy server 130 may match the computing devices 110 and 120 with the mobile device 140 based on unique identifications associated with the computing devices 110 and 120 and the mobile device 140. Alternatively or additionally, the proxy server 130 may match the computing devices 110 and 120 with the mobile device 140 based on location information associated with the computing devices 110 and 120 and the mobile device 140. The proxy server 130 may receive from one or more computing devices 110 and 120 a geographic location of the computing device and receive a geographic location of the mobile device 140 from the mobile device 140. The proxy server 130 then determines to which computing device the user is attempting to transfer the credentials based on a distance between the geographic locations between the mobile device and the computing device being less than a threshold distance (e.g., 2 meters, 5 meters, 10 meters, or 100 meters). The threshold distance may be set based on an exactness of the geographic location of the computing device 110/120, an exactness of the geographic location of the mobile device, and a typical distance between a user's mobile phone and laptop or desktop computer when the user is accessing the laptop or desktop computer. The threshold distance may be a default distance that is set automatically by the network or may be set manually by the user such that any computing device-mobile device combination having a geographic separation greater than the threshold distance is not considered. The computing device(s) and the mobile device 140 may determine their geographic locations based on one or more of a global positioning system (GPS) signal, a WiFi signal, a cellular signal, or an IP address, for example, using triangulation of GPS or cellular signals, assisted GPS, a data repository (e.g., provided by Google® Corporation of Mountain View, Calif.) for converting WiFi signal(s) into geographic location(s), or a data repository for converting IP addresses into geographic locations. If assisted GPS is used, the threshold time or the time for processing the connection request may be increased, due to the slower speed of assisted GPS technology. As an added security, after the mobile device 140 and the computing device 110/120 are identified by the proxy server 130, the mobile device 140 and/or computing device 110 or 120 may also be presented a challenge to ensure that both devices are correctly paired. The challenge may include any type of challenge, for example, a pin-based challenge, a pattern challenge, a movement-based challenge, etc. Both devices may be correctly paired, for example, if both devices are within the proximity of the authorized user or accessible to the authorized user. A device may within the proximity of the authorized user if the user may access the device with his/her hand, for example, if the device is in the user's purse or pocket or on a table adjacent to the user. A device may be accessible to the authorized user if the user is able to access the device. For example, if the user is able to turn on the device, unlock the device, and access software on the device. For example, the authorized user may be within the proximity of the mobile phone 140 and may not be within the proximity of a remote computing device 110 or 120. The user may use an additional computer, different from the remote computing device, to connect to the remote computing device 110 or 120 via a virtual private network (VPN), while both the mobile phone 140 and the remote computing device 110 or 120 are accessible to the user.

Once the computing device 110 or 120 has been identified and paired using the above steps, the mobile device 140 may then send the information or credential to the computing device 110 or 120 over an encrypted channel via the proxy server 130. The encrypted channel corresponds to the data transmission path from the mobile device 140 to the computing device 110/120 via the proxy server 130 and is set up upon pairing of the mobile device with the computing device 110/120. The communication medium may be encrypted using a shared secret key which may, in some cases, be commonly developed by the application and background service developer and preinstalled into both pieces of software. Once the information has been transmitted to the computing device 110 or 120, depending on the type of information transmitted, the computing device 110 or 120 may locally determine how to use the transmitted information. For example, if the mobile device 140 has transmitted login credentials for a website or an application, upon receipt, the background service of the computing device 110 or 120 may attempt to use web browser's auto fill capability to insert those credentials into the password input or other credential entry area of the appropriate website or application that the user is attempting to securely access via the computing device 110 or 120. These techniques may be extended to sending any kind of information by extending the application of the mobile device 140 to provide different "destination types" and programming the background service of the computing device 110 or 120 to accept and have access to those various destinations once the information is received. For example, if the computing device 110/120 is attempting to access an online store, the mobile device 140 may transmit payment information (e.g., credit card number) and shipping information (e.g., shipping address) to the computing device 110/120 to expedite entry of such information. Alternatively, if the user is attempting to fill out a web form (e.g., an employment application or an application for a new bank account) at the computing device 110/120, the mobile device may transmit information about the user, stored at the mobile device (e.g., the user's name, address, telephone number, etc.), for filling out the web form.

According to some implementations, the mobile device 140 transmits, to the computing device 110 or 120, via the proxy server 130, authentication credentials for authenticating access of the computing device 110 or 120 to a secure resource. For example, the user may store his/her login information to an online banking service at the mobile device 140 via the application of the mobile device 140. While at the airport, the user may remember that he/she needs to pay a bill, but not remember his/her password for online banking. In order to access his/her online banking service, the user may access a desktop computer (e.g., desktop computer 110) at a kiosk at the airport and may have his/her mobile device 140 transmit the login credentials for the online banking service to the desktop computer via the proxy server 130. Advantageously, the user may be permitted to securely access the online banking service while securely identifying him/herself (e.g., by possessing the mobile device 140) and without needing to remember his/her password. To protect the user's privacy, in some cases, the user's geographic location may not be transmitted to the website/application the user is accessing. Alternatively, with appropriate permission from the user, the geographic location may be transmitted to the website/application, and the website/application may analyze the information for statistical purposes (e.g., a social networking service may wish to determine what percentage of its users access the social networking service from locations in New York City.)

Figure 2:
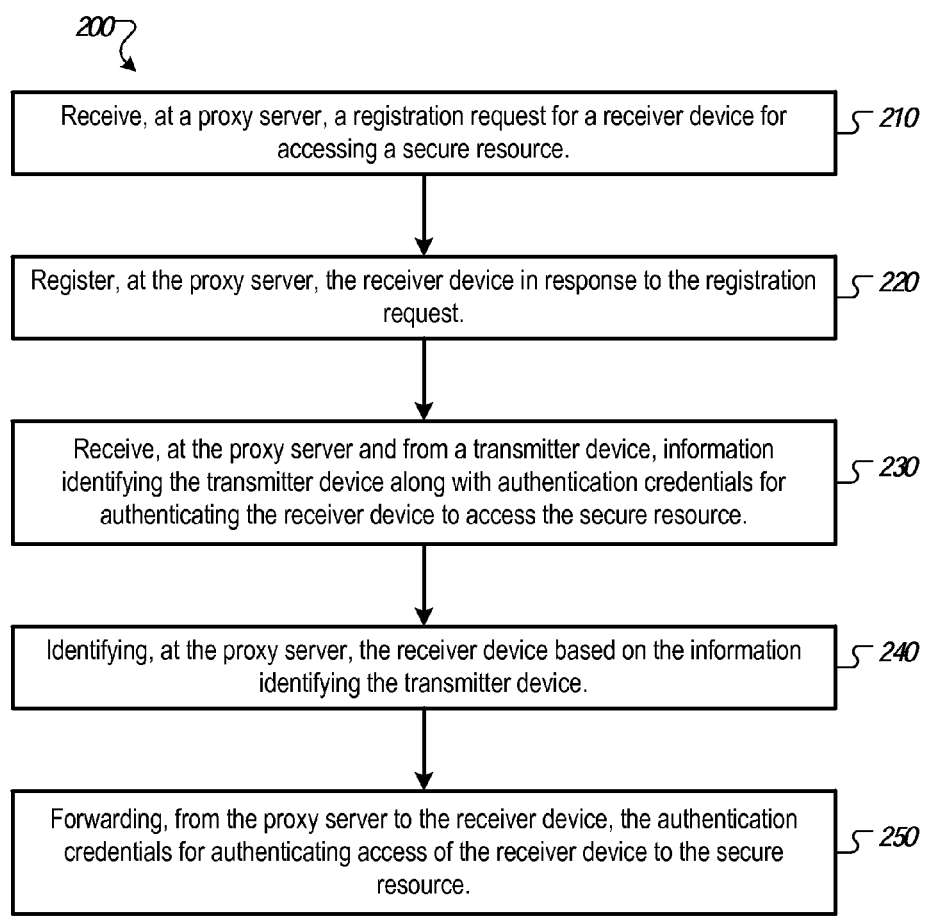
FIG. 2 illustrates an exemplary process for mobile-based authentication.

FIG. 2 illustrates an exemplary process 200 for mobile-based authentication. The process 200 begins at step 210, where a proxy server (e.g., proxy server 130) receives a registration request for a receiver device (e.g., one of the computing devices 110 or 120) for accessing a secure resource (e.g., logging into an online banking service, a social networking service, an online store, etc.). The registration request may be received via any network, for example, the Internet, a wireless network, a wired network, a local area network, or a wide area network. For example, a user may register his/her personal computer as a receiver device to be able to access secure resource(s) using the personal computing device. Alternatively, a computing device used by multiple different users (e.g., an Internet kiosk at an airport or Internet café) may be registered to receive login credentials from mobile phone(s) of many different user(s). The registration request may include geographic location information of the receiver device. When registered with the proxy server, a receiver device may not be associated with a specific user or a specific mobile device. Alternatively, the receiver device may be associated with a specific user or a specific receiver device identified in the registration request.

In step 220, in response to the registration request, the proxy server registers the receiver device in response to the registration request. The registration may include storing, at the proxy server, an identifier of the receiver device. The identifier may include a serial number and/or location information associated with the receiver device. The registration may also include storing, at the receiver device, a service (e.g., a software service) for communicating with the proxy server and allowing the proxy server to provide information (e.g., login credentials) to application(s) (e.g., a web browser) that provide access to secure resources.

In step 230, the proxy server receives, from a transmitter device (e.g., mobile device 140), information identifying the transmitter device along with authentication credentials for authenticating the receiver device to access the secure resource. The information identifying the transmitter device may include a username or a MDN. The information may also include location information associated with the transmitter device. The secure resource may be a web-based resource and the authentication credentials may include a username and a password for accessing the web-based resource. The transmitter device may store multiple credentials for accessing multiple web-based resources associated with a user, for example, credentials for accessing the user's web-based email(s), social networking service(s), online banking service(s), online store(s), etc. The transmitter device and the receiver device may be end-user computing devices which may be used by end-users (e.g., consumers or customers) to access the Internet, write paper(s), play game(s), make telephone call(s), etc.

In step 240, in response to receiving the information identifying the transmitter device, the proxy server identifies the receiver device based on information identifying the transmitter device. The proxy server may receive registration information from a plurality of receiver devices. Similarly, the proxy server may receive identifying and credential information from a plurality of transmitter devices. To this end, the proxy server may match the corresponding receiver and transmitter devices to ensure that the credentials are forwarded from the transmitter device to a correct receiver device.

In one implementation, the proxy server may utilize location information of the receiver device and the transmitter device to pair the receiver and the transmitter device. The transmitter device may transmit information to the proxy server upon being accelerated at an acceleration corresponding to selecting a button while running a specific application for communicating with the proxy server. The receiver device may transmit information to the proxy server upon a selection of a button (e.g., a space bar) thereon while running an application (e.g., displaying a webpage via a web browser) with the receiver device. The user may simultaneously, and while the transmitter device and the receiver device are at the same geographic location, indicate that he/she wishes to transmit information from the transmitter device to the receiver device by selecting the button on the receiver device with the transmitter device (e.g., pressing a spacebar of a keyboard of a laptop or desktop computer with a mobile phone). In response, location information from the receiver device and the transmitter device, which are separated by a threshold distance (e.g., 5 meters, 10 meters, etc.) may be transmitted to the proxy server. This information can be used to pair the transmitter device and the receiver device.

In another implementation, instead or in addition to using the location information, the proxy server may use the time arrival signals from the receiver device and the transmitter device to pair the receiver device and the transmitter device. In keeping with the previous example, the user may simultaneously, and while the transmitter device and the receiver device are at the same geographic location, indicate that he/she wishes to transmit information from the transmitter device to the receiver device by selecting the button on the receiver device with the transmitter device (e.g., pressing a spacebar of a keyboard of a laptop or desktop computer with a mobile phone). In response, signals from the transmitter device and the receiver device, which are separated by a threshold time (e.g., 0.5 seconds, 1 second, 2 seconds, 5 seconds, etc.) may be transmitted to the proxy server. The proxy server may use this information to pair the receiver device and the transmitter device. The threshold time may be determined based on a processing speed of the transmitter device, a processing speed of the receiver device, a network speed, etc. The threshold time may be a default time that is set automatically on the network or may be set manually by the user such that signals from the transmitter device and the receiver device arriving at a time greater than the threshold time are either not transmitted to the proxy server or are not associated with each other.

In yet another implementation, the proxy server may use prior registration information to pair the transmitter device and the receiver device. For example, the proxy server may be a server of a telephone company. The user may register, with the telephone company, computing device(s) (e.g., receiver devices) authorized to access payment information via the user's mobile phone (e.g., transmitter device). The computing device(s) may be identified based on cookies stored at the computing device(s) or based on identifier(s) of the computing device(s) stored at the proxy server.

In some cases, the receiver device may not have been associated with either the transmitter device or the user of the transmitter device previously as such using the prior registration implementation may not be possible. For example, the receiver device may be an Internet kiosk in an airport or a lobby of a corporation that the user is using for the first time in his/her life. In this scenario, to identify the receiver device from among multiple receiver devices registered with the proxy server, location information may be used. As noted above, the proxy server may receive the geographic location(s) of the transmitter device and the receiver device and pair them based on the receiver device being less than a threshold distance (e.g., 10 meters, 20 meters, etc.) away from the transmitter device. The proxy server may identify the receiver device based on the receiver device being proximate to the transmitter device, for example, as described in greater detail below in conjunction with FIGS. 3A-3C.

The proxy server may also transmit to the receiver device a verification code and receive, at the transmitter device, a user input corresponding to the verification code. Alternatively, the proxy server may transmit to the transmitter device a verification code and receive, at the receiver device, a user input corresponding to the verification code. The verification code may provide additional security, proving that the user requesting the information transfer has access to both the transmitter device and the receiver device at the time of the information transfer.

Upon successful pairing of the transmitter device and the receiver device, in step 250, the proxy server forwards, to the receiver device, the authentication credentials for authenticating access of the receiver device to the secure resource. The receiver device may then access the secure resource using the authentication credentials. For example, if the authentication credentials are for logging into a social networking service, the receiver device may log into the social networking service (e.g., via a web browser or a special purpose application for accessing the social networking service) using the authentication credentials. After step 250, the process 200 ends.

Figure 3A:
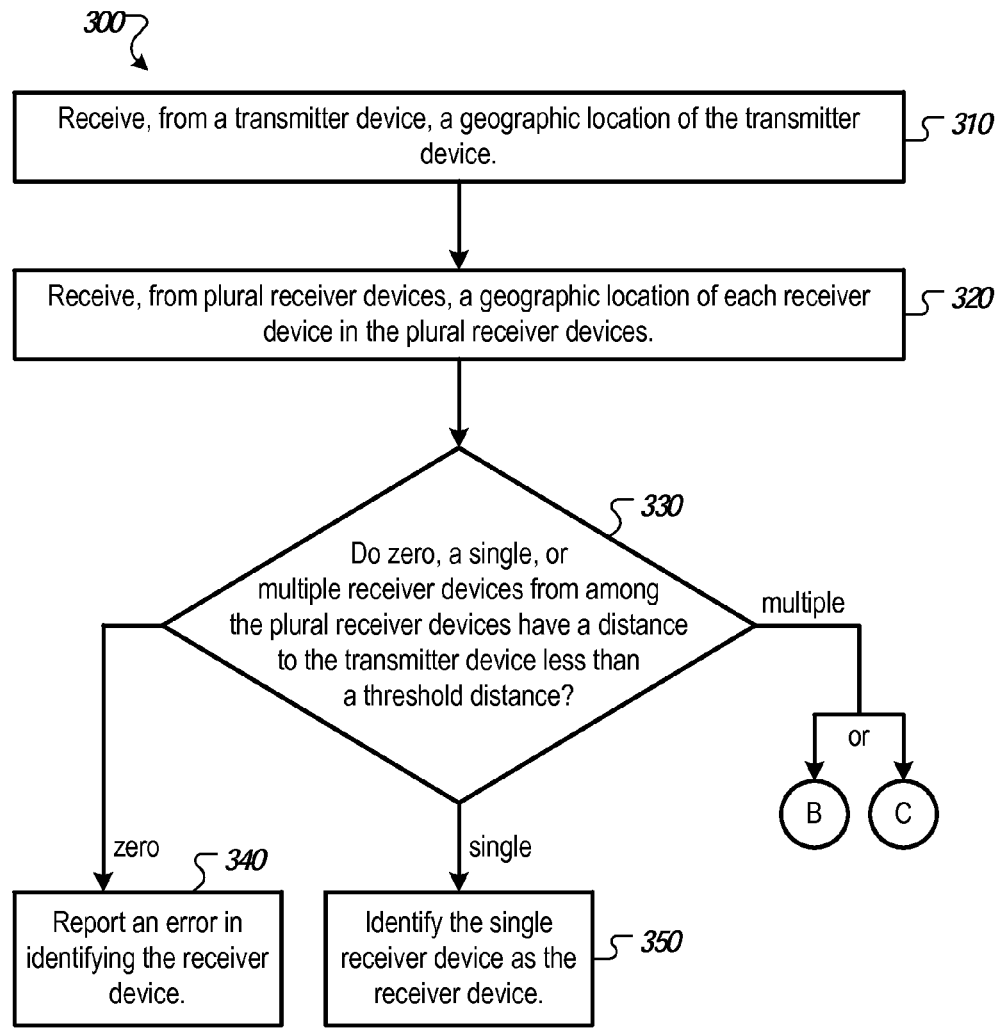

FIGS. 3A-3C illustrate an exemplary process 300 for identifying a receiver device to receive authentication credentials from a transmitter device. As shown in FIG. 3A, the process 300 begins at step 310, where a proxy server (e.g., proxy server 130) receives, from a transmitter device (e.g., mobile device 140) a geographic location of the transmitter device. The transmitter device may determine its geographic location based one or more GPS, WiFi, cellular, or IP address signals accessible to the transmitter device. The transmitter device may provide its geographic location to the proxy server together with a request to transmit data via the proxy server or in response to a prompt from the proxy server.

In step 320, the proxy server receives, from plural receiver devices (e.g., computing devices 110 and 120 of FIG. 1), a geographic location of each receiver device in the plural receiver devices. The plural receiver devices may include all of the receiver devices registered with the proxy server, receiver devices registered with the proxy server that are attempting to receive data via the proxy server, or receiver devices registered with the proxy server associated with the same account as the transmitter device.

In step 330, upon receiving the geographic locations of the transmitter device and the receiver devices, the proxy server determines whether zero, a single, or multiple receiver devices from among the plural receiver devices have a distance to the transmitter device less than a threshold distance (e.g., 2 meters, 5 meters, or 10 meters). If zero receiver devices have a distance to the transmitter device less than the threshold distance, the process 300 continues to step 340. If one receiver device has a distance to the transmitter device less than the threshold distance, the process 300 continues to step 350. If multiple receiver devices have a distance to the transmitter device less than the threshold distance, the process 300 continues to either step 360B of FIG. 3B or step 360C of FIG. 3C, depending on the programming of the proxy server.

In step 340, if zero receiver devices have a distance to the transmitter device less than the threshold distance, the proxy server reports an error in identifying the receiver device. The error may be reported to the transmitting device. In most situations, a user requesting to transmit authentication credentials from a transmitter device (e.g., mobile device) to a receiver device (e.g., computing device accessing a webpage) has both the transmitter device and the receiver device at his/her location (e.g., in front of him/herself, in his/her office, in his/her office, at a café, etc.). Thus, the transmitter device and the receiver device may, in some cases, be closer to one another than the threshold distance. After step 340, the process 300 ends.

In step 350, if one receiver device has a distance to the transmitter device less than the threshold distance, the proxy server identifies the single receiver device as the receiver device to receive the authentication credentials from the transmitter device. After step 350, the process 300 ends.

In step 360B of FIG. 3B, if multiple receiver devices have a distance to the transmitter device less than the threshold distance, the proxy server transmits, to the transmitter device a verification code and perhaps instructions for the user to enter the verification code into the user's receiver device. The verification code may include a numeric pin, a text keyword, a mouse movement, etc.

In step 370B, the proxy server receives, from one of the receiver devices from among the multiple receiver devices, a user input corresponding to the verification code. For example, the user may type the pin or the keyword into the receiver device or move the mouse of the receiver device according to the mouse movement in the verification code. The user may be provided an interface (e.g., an input box) to enter the verification code at the receiver device. In the event of an incorrect entry or a timeout, the user may be notified that the pairing of the transmitter device and the receiver device was unsuccessful. The user may be given the opportunity to reattempt pairing or to access the online resource using another technique (e.g., manual entry of login credentials).

In step 380B, the proxy server identifies the one of the receiver devices as the receiver device to receive the authentication credentials from the transmitter device. After step 380B, the process 300 ends.

In step 360C of FIG. 3C, if multiple receiver devices have a distance to the transmitter device less than the threshold distance, the proxy server transmits, to each of the multiple receiver devices, a verification code uniquely associated with a corresponding one of the multiple receiver devices and perhaps instructions for the user to enter the verification code into the user's transmitter device. Each of the multiple receiver devices receives its own unique verification code which may include, for example, a numeric pin, a text keyword, a pattern to draw on a touchscreen of the transmitter device, a movement of the transmitter device, an image, an audio signal, etc.

In step 370C, the proxy server receives, from the transmitter device, a user input corresponding to a verification code corresponding to a specific one of the multiple receiver devices. For example, the user may enter the numeric pin, enter the text keyword, draw the pattern on the touchscreen of the transmitter device, move the transmitter device according to the movement in the verification code corresponding to the specific one of the multiple receiver devices, take a photograph, using a camera of the transmitter device, of the image in the verification code, displayed on the screen of the specific one of the multiple receiver devices, with the transmitter device, record the audio signal, using a microphone of the transmitter device, from the specific one of the multiple receiver devices with the transmitter device, etc. Taking a photograph, using the transmitter device, of an image displayed at the receiver device, or recording audio, using the transmitter device, of sounds played at the receiver device verifies that the transmitter device and the receiver device are proximate (e.g., within a visibility or hearing range) to one another, as a transmitter device cannot take a photograph or record audio from a remote receiver device. The user may be provided an interface (e.g., an input box) to enter the verification code at the transmitter device. In the event of an incorrect entry or a timeout, the user may be notified that the pairing of the transmitter device and the receiver device was unsuccessful. The user may be given the opportunity to reattempt pairing or to access the online resource using another technique (e.g., manual entry of login credentials).

If a photograph is used, the proxy server may compare the image that was transmitted to the receiver devices with the photograph that was received from the transmitter device. If the photograph is similar to the image (e.g., a Hamming Distance or Sequence Alignment value indicates that the photograph is similar to the image), the transmitter device may be paired with the receiver device. Otherwise, an error message may be transmitted to the transmitter device or the receiver device indicating that the devices were not paired.

If an audio signal is used, the proxy server may compare the audio signal that was transmitted to the receiver devices with the sound recording that was received from the transmitter device. If the audio signal is similar to the sound recording (e.g., a Hamming Distance or Sequence Alignment value indicates that the audio signal is similar to the sound recording), the transmitter device may be paired with the receiver device. Otherwise, an error message may be transmitted to the transmitter device or the receiver device indicating that the devices were not paired.

In step 380C, the proxy server identifies the specific one of the multiple receiver devices as the receiver device to receive the authentication credentials from the transmitter device. After step 380C, the process 300 ends.

According to some implementations, a laptop or desktop computer accesses a website and requests authentication information from the server. In response, the server identifies a corresponding mobile device and requests credential information from the mobile device using either prior registration information, stored at the server, associating the laptop or desktop computer with the mobile device or using location information indicating that the laptop or desktop computer and the mobile device are within a threshold distance (e.g., 5 meters or 10 meters) of one another.

According to some implementations, a laptop or desktop computer accesses a website and requests authentication information from the server. At substantially the same time (e.g., within 2 seconds, 5 seconds, 10 seconds, etc.), the server also receives identifying information from the mobile device and uses the identifying information to match the mobile device to the laptop or desktop computer. In some aspects, the identifying information includes a mobile directory number (MDN) and the matching is based on prior registration information. In some aspects, the identifying information includes geographic location information and the matching is based on the geographic location information.

FIGS. 4 and 5 provide functional block diagram illustrations of general purpose computer hardware platforms. FIG. 4 illustrates a network or host computer platform, as may typically be used to implement a server. FIG. 5 depicts a computer with user interface elements, as may be used to implement a personal computer or other type of work station or terminal device, although the computer of FIG. 5 may also act as a server if appropriately programmed. It is believed that the general structure and general operation of such equipment as shown in FIGS. 4 and 5 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 5). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, examples of the methods of managing information about content transmission outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the application(s) 150, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a Blu-ray disc read-only memory (BD-ROM), CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

These general and specific aspects may be implemented using a system, a method, a computer program, a computer readable medium, or an apparatus or any combination of systems, methods, computer programs, computer readable mediums, and/or apparatuses While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
receiving, at a proxy server, a registration request for a receiver device for accessing a secure resource;
registering, at the proxy server, the receiver device in response to the registration request;
receiving, at the proxy server and from a transmitter device different from the receiver device, information identifying the transmitter device along with authentication credentials for authenticating the receiver device to access the secure resource, wherein the information identifying the transmitter device includes a Mobile Directory Number (MDN) and wherein the transmitter device and the receiver device are end-user computing devices;
identifying, at the proxy server, the receiver device based at least in part on the information identifying the transmitter device; and
forwarding, from the proxy server to the receiver device, the authentication credentials for authenticating access of the receiver device to the secure resource.

2. The method of claim 1, wherein:
receiving the registration request includes receiving, at the proxy server, the registration request from the receiver device, the registration request including location information of the receiver device,
receiving the information identifying the transmitter device includes receiving, at the proxy server, information identifying location information of the transmitter device, and
identifying the receiver device includes identifying, at the proxy server, a receiver device from among a plurality of receiver devices being registered at the proxy server, based on a distance between the location information of the receiver device and the location information of the transmitter device being less than a predetermined threshold distance.

3. The method of claim 2, wherein:
the secure resource include a web-based resource,
the authentication credentials include credentials for accessing the web-based resource,
the transmitter device includes a mobile device of a user, and
the receiver device includes a proximate computing device not previously associated with the user, the receiver device running a web browser for accessing the web-based resource.

4. The method of claim 1, wherein:
receiving, at the proxy server, the registration request includes receiving, at the proxy server, the registration request including information identifying the receiver device and information identifying the transmitter device, and
identifying, at the proxy server, the receiver device includes identifying, at the proxy server, a receiver device from among a plurality of receiver devices being registered at the proxy server with the information identifying the transmitter device.

5. The method of claim 1, wherein:
the secure resource includes a secure web-based resource, and
the transmitter device includes a mobile phone of a user configured to store a plurality of credentials for accessing a plurality of web-based resources, the plurality of credentials being associated with the user.

6. The method of claim 1, wherein identifying the receiver device based on the information identifying the transmitter device further includes:
   transmitting, from the proxy server and to the receiver device, a verification code; and
   receiving, from the transmitter device and at the proxy server, a user input corresponding to the verification code.

7. The method of claim 1, wherein identifying the receiver device based on the information identifying the transmitter device further includes:
   transmitting, from the proxy server and to the transmitter device, a verification code; and
   receiving, from the receiver device and at the proxy server, a user input corresponding to the verification code.

8. The method of claim 1, wherein identifying the receiver device includes identifying the receiver device based on a stored pairing of the transmitter device and the receiver device.

9. The method of claim 1, wherein identifying the receiver device includes identifying the receiver device based on geographic location information of the transmitter device and geographic location information of the receiver device.

10. A method, comprising:
    receiving, at a proxy server, a registration request for a receiver device for accessing a secure resource;
    registering, at the proxy server, the receiver device in response to the registration request;
    receiving, at the proxy server and from a transmitter device different from the receiver device, information identifying the transmitter device along with authentication credentials for authenticating the receiver device to access the secure resource, wherein the transmitter device and the receiver device are end-user computing devices;
    identifying, at the proxy server, the receiver device based at least in part on the information identifying the transmitter device; and
    forwarding, from the proxy server to the receiver device, the authentication credentials for authenticating access of the receiver device to the secure resource,
    wherein identifying the receiver device based on the information identifying the transmitter device further includes:
    receiving, from the transmitter device, a geographic location of the transmitter device; receiving, from the receiver device, a geographic location of the receiver device;
    determining whether the receiver device is an only receiver device within a specified distance from the transmitter device;
    upon determining that the receiver device is the only receiver device within the specified distance from the transmitter device, identifying the receiver device as a pair of the transmitter device; and
    upon determining multiple receiver devices within a specified distance from the transmitter device, identifying the receiver device further includes:
    transmitting, to the transmitter device, a verification code;
    receiving, from one of the receiver devices from among the multiple receiver devices, a user input corresponding to the verification code; and
    identifying the one of the receiver devices as the receiver device.

11. A method, comprising:
    receiving, at a proxy server, a registration request for a receiver device for accessing a secure resource;
    registering, at the proxy server, the receiver device in response to the registration request;
    receiving, at the proxy server and from a transmitter device different from the receiver device, information identifying the transmitter device along with authentication credentials for authenticating the receiver device to access the secure resource, wherein the transmitter device and the receiver device are end-user computing devices;
    identifying, at the proxy server, the receiver device based at least in part on the information identifying the transmitter device; and
    forwarding, from the proxy server to the receiver device, the authentication credentials for authenticating access of the receiver device to the secure resource,
    wherein identifying the receiver device based on the information identifying the transmitter device further includes:
    receiving, from the transmitter device, a geographic location of the transmitter device; receiving, from the receiver device, a geographic location of the receiver device;
    determining whether the receiver device is an only receiver device within a specified distance from the transmitter device;
    upon determining that the receiver device is the only receiver device within the specified distance from the transmitter device, identifying the receiver device as a pair of the transmitter device; and
    upon determining multiple receiver devices that are end-user computing devices are within a specified distance from the transmitter device, identifying the receiver device further includes:
    transmitting, to each of the multiple receiver devices, a verification code uniquely associated with a corresponding one of the multiple receiver devices;
    receiving, from the transmitter device, a user input corresponding a verification code corresponding to a specific one of the multiple receiver devices; and
    identifying the specific one of the multiple receiver devices as the receiver device.

12. A non-transitory computer-readable medium comprising instructions which, when executed by a proxy server, cause the proxy server to:
    receive, at the proxy server, a registration request for a receiver device for accessing a secure resource;
    register, at the proxy server, the receiver device in response to the registration request;
    receive, at the proxy server and from a transmitter device different from the receiver device, information identifying the transmitter device along with authentication credentials for authenticating the receiver device to access the secure resource, wherein the information identifying the transmitter device includes a Mobile Directory Number (MDN) and wherein the transmitter device and the receiver device are end-user computing devices;
    identify, at the proxy server, the receiver device based at least in part on the information identifying the transmitter device; and
    forward, from the proxy server to the receiver device, the authentication credentials for authenticating access of the receiver device to the secure resource.

13. The non-transitory computer-readable medium of claim 12, wherein:
the instructions to receive the registration request include instructions to receive, at the proxy server, the registration request from the receiver device, the registration request including location information of the receiver device,
the instructions to receive the information identifying the transmitter device include instructions to receive, at the proxy server, information identifying location information of the transmitter device, and
the instructions to identify the receiver device include instructions to identify, at the proxy server, a receiver device from among a plurality of receiver devices being registered at the proxy server, based on a distance between the location information of the receiver device and the location information of the transmitter device being less than a predetermined threshold distance.

14. The non-transitory computer-readable medium of claim 13, wherein:
the secure resource include a web-based resource,
the authentication credentials include credentials for accessing the web-based resource,
the transmitter device includes a mobile device of a user, and
the receiver device includes a proximate computing device not previously associated with the user, the receiver device running a web browser for accessing the web-based resource.

15. The non-transitory computer-readable medium of claim 13, wherein:
the secure resource includes a secure web-based resource, and
the transmitter device includes a mobile phone of a user configured to store a plurality of credentials for accessing a plurality of web-based resources, the plurality of credentials being associated with the user.

16. The non-transitory computer-readable medium of claim 12, wherein:
the instructions to receive, at the proxy server, the registration request include instructions to receive, at the proxy server, the registration request including information identifying the receiver device and information identifying the transmitter device, and
the instructions to identify, at the proxy server, the receiver device include instructions to identify, at the proxy server, a receiver device from among a plurality of receiver devices being registered at the proxy server with the information identifying the transmitter device.

17. The non-transitory computer-readable medium of claim 12, wherein the instructions to identify the receiver device based on the information identifying the transmitter device further include instructions to:
transmit, from the proxy server and to the receiver device, a verification code; and
receive, from the transmitter device and at the proxy server, a user input corresponding to the verification code.

18. A system comprising:
one or more processors; and
a memory comprising instructions which, when executed by the one or more processors, cause the one or more processors to:
receive, at a proxy server, a registration request for a receiver device for accessing a secure resource;
register, at the proxy server, the receiver device in response to the registration request;
receive, at the proxy server and from a transmitter device different from the receiver device, information identifying the transmitter device along with authentication credentials for authenticating the receiver device to access the secure resource, wherein the information identifying the transmitter device includes a Mobile Directory Number (MDN) and wherein the transmitter device and the receiver device are end-user computing devices;
identify, at the proxy server, the receiver device based at least in part on the information identifying the transmitter device; and
forward, from the proxy server to the receiver device, the authentication credentials for authenticating access of the receiver device to the secure resource.

* * * * *